(12) United States Patent
Pelletier et al.

(10) Patent No.: US 8,639,073 B2
(45) Date of Patent: Jan. 28, 2014

(54) FIBER COUPLING TECHNIQUE ON A WAVEGUIDE

(75) Inventors: Francois Pelletier, Saint-Augustin-de-Desmaures (CA); Guillaume Robidoux, St-Nicolas (CA); Yves Painchaud, Quebec (CA)

(73) Assignee: Teraxion Inc., Quebec (CA)

( * ) Notice: Subject to any disclaimer, the term of this patent is extended or adjusted under 35 U.S.C. 154(b) by 7 days.

(21) Appl. No.: 13/550,325

(22) Filed: Jul. 16, 2012

(65) Prior Publication Data

US 2013/0022316 A1 Jan. 24, 2013

Related U.S. Application Data

(60) Provisional application No. 61/509,256, filed on Jul. 19, 2011.

(51) Int. Cl.
*G02B 6/26* (2006.01)
*G02B 6/30* (2006.01)
*G02B 6/34* (2006.01)

(52) U.S. Cl.
USPC .............................................. 385/37; 385/43

(58) Field of Classification Search
USPC ................................ 385/33, 34, 35, 36, 37, 38
See application file for complete search history.

(56) References Cited

U.S. PATENT DOCUMENTS

| | | | |
|---|---|---|---|
| 5,581,639 A * | 12/1996 | Davies et al. | 385/10 |
| 7,065,272 B2 | 6/2006 | Taillaert et al. | |
| 7,162,124 B1 | 1/2007 | Gunn et al. | |
| 7,184,625 B2 | 2/2007 | Gunn et al. | |
| 8,064,745 B2 * | 11/2011 | Fortusini et al. | 385/37 |
| 2008/0002929 A1 * | 1/2008 | Bowers et al. | 385/15 |
| 2009/0059988 A1 * | 3/2009 | Sekiguchi | 372/50.11 |
| 2010/0128576 A1 * | 5/2010 | Fang et al. | 369/13.24 |
| 2011/0299561 A1 * | 12/2011 | Akiyama | 372/50.11 |
| 2013/0215084 A1 * | 8/2013 | Jensen | 345/175 |

\* cited by examiner

*Primary Examiner* — Akm Enayet Ullah
(74) *Attorney, Agent, or Firm* — Baker & Hostetler LLP (57) ABSTRACT

An optical coupling assembly for coupling light from an optical fiber including an angled tip into a planar waveguide via a waveguide coupling element is provided. In one embodiment, the optical fiber extends along the planar waveguide with the angled tip positioned such that light propagating in the optical fiber is coupled by the waveguide coupling element to propagate in the planar waveguide in counter propagation with respect to a fiber propagation direction. In another embodiment, the optical fiber includes a tapered peripheral portion tapering toward the angled tip and is disposed over the planar waveguide with the tapered peripheral portion extending therealong such that light propagating in the optical fiber is coupled to propagate in the planar waveguide with either forward or counter propagation. Embodiments of the present invention may be part of various photonic integrated circuits and may be manufactured more easily than known optical coupling assemblies.

29 Claims, 6 Drawing Sheets

FIBER COUPLING TECHNIQUE ON A WAVEGUIDE

CROSS-REFERENCE TO RELATED APPLICATIONS

This application is a Nonprovisional of U.S. Patent Application Ser. No. 61/509,256, filed on Jul. 19, 2011, the disclosure of which is incorporated herein by reference in its entirety.

FIELD OF THE INVENTION

The present invention relates to the field of coupling optical fibers to planar waveguides, and more particularly concerns optical coupling assemblies for the coupling of light between an optical fiber and a planar waveguide.

BACKGROUND OF THE INVENTION

As telecommunication systems evolve from 10 Gb/s transmission rate to 40 Gb/s and now 100 Gb/s, more sophisticated modulation scheme are developed. For example, phase modulation is increasingly used rather than simpler amplitude modulation. At 100 Gb/s, coherent communication involving polarization multiplexing further adds to the required complexity at the transmitter and receiver sides. In particular, more optical processing is required and calls for photonic integrated solutions.

The more complex hardware required at the transmitter and receiver sides also mean additional physical space. The integration on both optical and electronic devices thus implies considerable amount of space in new systems.

For at least these reasons, there is an immediate need to reduce the size of the optical functions that are implemented into optical systems. To this end, using optical integrated circuits can be an excellent approach for reducing by orders of magnitude the size of optical devices. Yet, efficient coupling of optical fiber inputs and outputs to a waveguide substrate remains a challenge when using integrated optics.

Connecting optical fibers to lightwave circuits may be achieved by various techniques. When the cross-sectional area of the fiber core is larger in size than that of the waveguide, the use of diffraction grating couplers is one of the most power efficient ways for coupling an optical signal. In a typical configuration, a diffraction grating is positioned on the surface of the waveguide and the signal enters the diffraction grating at a nearly normal angle from the surface.

The angle of incidence on the diffraction grating needs to be close to perpendicular, but a small incidence angle is preferred to avoid the strong back reflection due to the second order of diffraction of the grating. An angle of between 5° and 20° from the vertical (i.e. the normal to the surface of the waveguide) is typical, but diffraction grating designs can be made to accommodate angles of incidence of up to 30°.

Attachment of the fiber with a butt coupling at a normal angle from the waveguide surface is not very practical for integration into systems, since it requires considerable additional space. For examples, the waveguide may include optoelectronic functions (e.g. photodiodes, variable optical attenuators, lasers, and the like) whose integration is normally made in the same plane as that of the circuit board on which the integrated photonic chip is typically mounted. Coupling at a normal angle thus implies that the optical fiber would exit perpendicularly to the supporting circuit board, which would be impractical in a dense integration scheme.

One approach known in the art has been proposed in U.S. Pat. No. 7,162,124 the contents of which are incorporated herein by reference, and consists in cutting the end of the fiber at 45° or less with respect to the fiber core in order for light propagating therein to be reflected either by total internal reflection or from a coated mirror deposited on the cleaved surface defined by the cut angle. This geometry allows the fiber to be parallel to the waveguide and reduces significantly the size of the assembly.

One drawback of the angled tip reflection is that the output light diverges when exiting the core of the fiber and goes through its cladding. The diverging angle causes power losses that are detrimental in high efficiency telecom applications. In order to overcome this problem, it has been proposed in U.S. Pat. No. 7,162,124 to reduce the fiber cladding thickness while maintaining the fiber parallel to the substrate. While resolving the power efficiency problem in theory, this method proves to be very difficult to implement efficiently in production. This is mainly due to the difficulty of precisely polishing the fiber core to an exact length along a significant portion of the fiber, since standard polishing techniques and equipment cannot be used.

There therefore remains a need for an improved optical coupling between an optical fiber and a waveguide that alleviates at least some of the above-mentioned drawbacks.

SUMMARY OF THE INVENTION

According to an aspect of the present invention, there is provided an optical coupling assembly. The optical coupling assembly includes:
  a planar waveguide including a light-guiding path;
  an optical fiber including a light-guiding fiber core surrounded by a fiber cladding and having an angled tip;
  a reflective layer provided on the angled tip, thereby defining a reflection interface; and
  a waveguide coupling element for coupling light between the optical fiber and the planar waveguide,
  the optical fiber extending along the planar waveguide with the angled tip positioned such that light propagating in the light-guiding fiber core along a fiber propagation direction is reflected by the reflection interface toward the waveguide coupling element and coupled thereby to propagate in the light-guiding path of the waveguide along a waveguide propagation direction opposite to the fiber propagation direction.

One of ordinary skill in the art will understand that in the optical coupling assembly according to this aspect of the invention, the light-guiding fiber core of the optical fiber is generally parallel to the light-guiding path of the planar waveguide, so that the orientation of the reflection interface with respect to the waveguide coupling element is determined by a cut angle of the angled tip. In a preferred embodiment, this cut angle is greater than about 45 degrees, which advantageously allows the angled tip to be more easily manufactured than in prior art designs. Indeed, a steeper cut angle reduces polishing difficulties since the resulting angled tip is less fragile and prone to chipping. As will be understood by one skilled in the art, chipping of the angled tip of the optical fiber may cause signal loss since the output signal generally exits in the vicinity of the fiber end.

One of ordinary skill in the art of waveguide design will also recognize the advantage of having the flexibility of reversing the waveguide propagation direction with respect to the fiber propagation direction. In particular, this flexibility generally eases the constraints imposed on the design of the optical coupling assembly. As a result, lightwave circuits including one or more optical coupling assemblies as above may support denser waveguide integration schemes. Furthermore, path crossovers on waveguides of such circuits, which may lead to the degradation of optical signals, may be reduced.

According to another aspect of the present invention, there is provided an optical coupling assembly. The optical coupling assembly includes:

- a planar waveguide including a light-guiding path;
- an optical fiber component including a light-guiding fiber core surrounded by a fiber cladding, an angled tip making a cut angle with respect to the light-guiding fiber core and defining a reflection interface, and a tapered peripheral portion tapering toward the angled tip at a tapering angle; and
- a waveguide coupling element for coupling light between the optical fiber component and the planar waveguide, the optical fiber component being disposed over the planar waveguide with the tapered peripheral portion extending therealong such that light propagating in the light-guiding fiber core of the optical fiber component is reflected by the reflection interface toward the waveguide coupling element and coupled thereby to propagate in the light-guiding path of the planar waveguide.

Advantageously, one of ordinary skill in the art will understand that in the optical coupling assembly according to this aspect of the invention, the waveguide coupling element may couple light in the light-guiding path of the planar waveguide along a waveguide propagation direction that is either substantially the same or opposite to a fiber propagation direction.

In one embodiment, the fiber cladding includes a tapered fiber cladding portion that defines at least part of the tapered peripheral portion. In another embodiment, the optical fiber component further includes a fiber support (e.g. an optical ferrule or a v-groove support) extending along the fiber cladding proximate the angled tip thereof, the fiber support including a tapered support portion that defines at least part of the tapered peripheral portion.

In one embodiment, the orientation of the reflection interface with respect to the waveguide coupling element is determined by a combination of the cut angle of the angled tip and the tapering angle of the tapered peripheral portion. Preferably, these two angles are jointly selected so that light reflected by the reflection interface toward the waveguide coupling element is incident on waveguide coupling element at an incidence angle of between 5 and 20 degrees on either side of a normal to a plane of the planar waveguide.

The tapering angle may be designed in a given embodiment of the optical coupling assembly to accommodate the geometry or configuration of the waveguide coupling element used with a particular planar waveguide. Furthermore, depending on the intended application of the optical coupling assembly, the tapering angle may also be designed in order to minimize or maximize the contact surface between the optical fiber component and the planar waveguide.

Other features and advantages of the present invention will be better understood upon a reading of the preferred embodiments thereof, with reference to the appended drawings.

DETAILED DESCRIPTION

The present invention generally relates to optical coupling assemblies for coupling light from an optical fiber into a planar waveguide.

Embodiments of the present invention may be particularly useful in any applications where it is necessary to couple light propagating in an optical fiber into a planar waveguide, or vice versa. In particular, although embodiments described herein may refer to the coupling of light from an optical fiber into a planar waveguide, it will be understood that the optical coupling assembly may also be employed in order to couple light from a planar waveguide into an optical fiber. Optical coupling assemblies according to embodiments of the present invention may be part of photonic integrated circuits used for various applications including, without being limited to, telecommunications, instrumentation, signal processing, and optical sensors.

Figure 1:
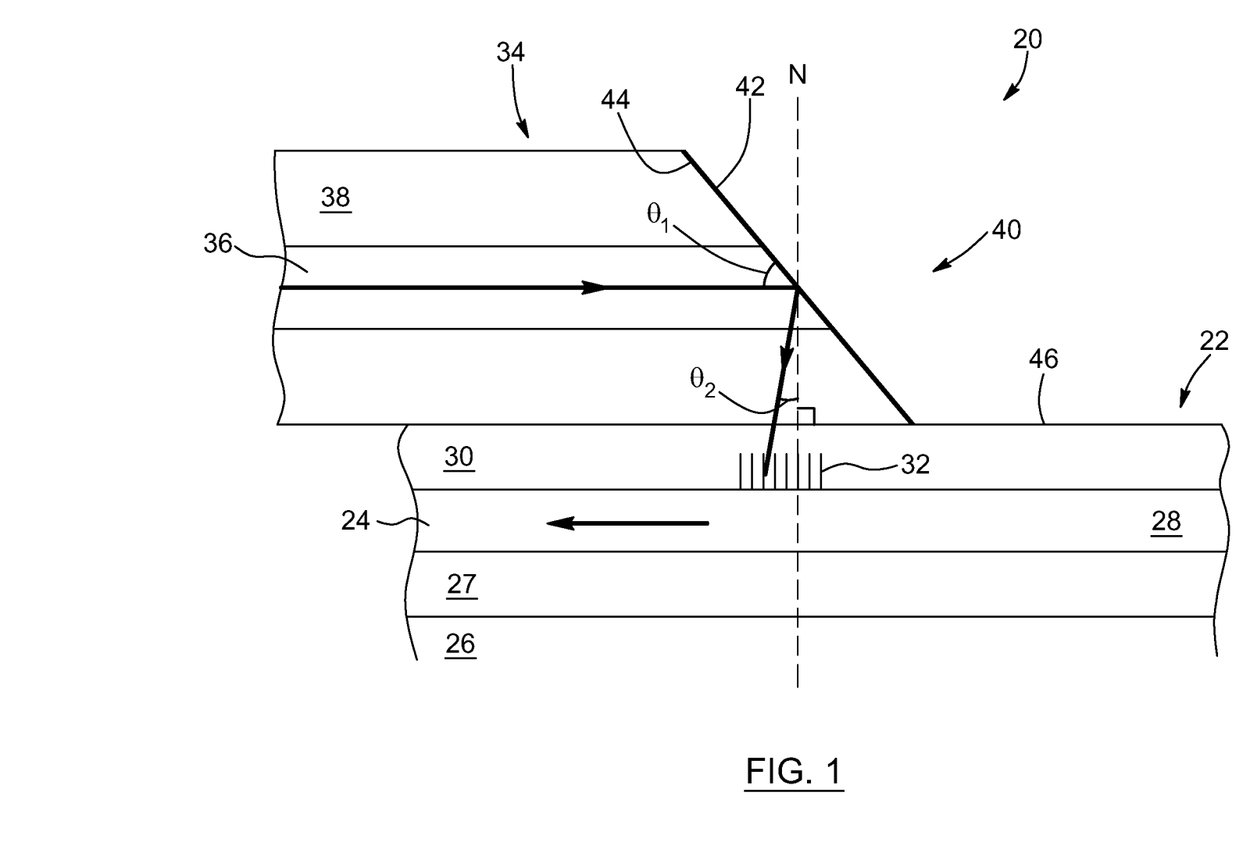
FIG. 1 is a schematic cross-sectional side view of an optical coupling assembly according to an embodiment of the invention, wherein the propagation direction of light in the light-guiding path of the planar waveguide is opposite to the propagation direction of light in the light-guiding fiber core.

FIG. 1 shows a schematic cross-sectional side view of an exemplary optical coupling assembly 20 according to an embodiment of the invention.

In this embodiment, the optical coupling assembly 20 first includes a planar waveguide 22 having a light-guiding path 24. In the present description, the term "planar waveguide" is understood to refer to an optical waveguide provided in a substantially integrated configuration, such as in a planar light circuit, and including a light guiding path supported by a suitable substrate. While the term "planar" suggests a flat structure, the term "planar waveguide" is also meant to encompass structures made of a plurality of flat layers. Likewise, the term "light-guiding path" is understood to refer herein to a plane or an axis of a planar waveguide along which light can be guided.

It will be understood by one of ordinary skill in the art that the planar waveguide 22 according to embodiments of the present invention may be embodied by any appropriate planar waveguide including, but not limited to, a slab waveguide, a strip waveguide, a ridge waveguide and a rib waveguide. In various embodiments, the planar waveguide 22 may include a plurality of layers stacked on a substrate, one of these of layers defining the light-guiding path 24. For example, in the embodiment illustrated in FIG. 1, the planar waveguide 22 is a silicon-on-insulator (SOI) waveguide, that is, an integrated circuit based on SOI technology. In this embodiment, the planar waveguide 22 therefore includes, successively, a substrate layer 26, a lower cladding layer 27 and a core layer 28 defining the light-guiding path 24. In this embodiment, an optional upper cladding layer 30 may also be provided. However, it will be understood that other embodiments based on SOI technology may be provided without an upper cladding layer 30 disposed over the core layer 28.

Examples of SOI waveguides may be found, for instance, in U.S. Pat. No. 7,065,272 and U.S. Pat. No. 7,184,625 the contents of which are incorporated herein by reference. It is however understood that this structure is presented by way of example only and that different planar waveguide structures may be considered without departing from the scope of the present invention. Likewise, the optical coupling assembly 20 according to embodiments of the present invention is not limited to SOI technology but may be based on various kinds of materials such as indium phosphide and gallium arsenide.

Still referring to FIG. 1, the optical coupling assembly 20 also includes an optical fiber 34 having a light-guiding fiber core 36 surrounded by a fiber cladding 38. The light-guiding fiber core 36 has preferably a refractive index higher than a refractive index of the fiber cladding 38, so that light may be guided therealong. It will be understood that the present invention is not limited to a particular type of optical fiber. In particular, the optical fiber 34 may be made of plastic, glass, quartz, silica or the like. Additionally, the optical fiber 34 may be polarization maintaining.

The optical fiber 34 has an angled tip 40 at one extremity thereof, the angled tip 40 making a cut angle $\theta_1$ with respect to the light-guiding fiber core 36. The formation of the angled tip 40 of the optical fiber 34 may be achieved by polishing, cleaving, grinding, sawing, etching, focused-ion-beam (FIB) machining or laser machining one extremity of the optical fiber 34 at the selected cut angle $\theta_1$.

The optical coupling assembly 20 further includes a reflective layer 42 provided on the angled tip 40, thereby defining a reflection interface 44, which is preferably substantially flat. The reflective layer 42 may for example be embodied by a metallic coating such as a gold, silver or aluminum coating. Alternatively, in other embodiments, the reflective layer 42 may be a dielectric coating. The reflective layer 42 may be deposited on the angled tip 40 using numerous techniques including, but not limited to, chemical vapor deposition (CVD), plasma-enhanced chemical vapor deposition (PECVD), ion beam deposition (evaporation coating), nanoscale growth, atomic layer deposition and molecular beam epitaxy.

It will be understood that the reflective layer 42 need not cover the entire reflection interface 44 as long as it extends at least over the area on which light guided in the light-guiding fiber core 36 of the optical fiber 34 impinges. Accordingly, light traveling along the light-guiding fiber core 36 will be reflected by the reflection interface 44 regardless of whether or not the angle of incidence of light thereon exceeds the critical angle predicted by Snell's law for total internal reflection at the reflection interface 44 between the angled tip 40 and the surrounding medium.

The optical coupling assembly 20 also includes a waveguide coupling element 32 for coupling light between the optical fiber 34 and the planar waveguide 22. As used herein, the term "waveguide coupling element" is understood to refer broadly to an optical element adapted for coupling light that is incident thereon from a given optical component (e.g. an optical fiber) into a waveguiding mode, and vice versa. More particularly, in the context of the coupling of light between an optical fiber and a planar waveguide, the term "waveguide coupling element" refers to an optical element capable of coupling a substantial fraction of an optical fiber mode into a waveguide mode, and vice versa.

In the embodiment illustrated in FIG. 1, the waveguide coupling element 32 is a diffraction grating, which may include, within the planar waveguide 22, linear corrugations or an embedded photonic crystal structure. Reference can again be made to U.S. Pat. No. 7,065,272 and U.S. Pat. No. 7,184,625 for non-limiting examples of such structures.

It will be understood by one of ordinary skill in the art that, while the waveguide coupling element 32 is disposed in a region of the upper cladding 30 proximate to the core layer 28 in the embodiment of FIG. 1, embodiments of the optical coupling assembly 20 are not limited by the location of the waveguide coupling element 32 within the planar waveguide 22 and various configurations are encompassed within the scope of the present invention. For example, in alternate embodiments, the waveguide coupling element 32 may be located completely inside the core layer 28 of the planar waveguide 22, or partly inside the core layer 28 and one of the lower 27 and upper 30 cladding layers. Furthermore, in some embodiments, the waveguide coupling element 32 may be provided integrally to the planar waveguide 22, for example by inscribing the waveguide coupling element 32 within the material making up the planar waveguide 22, or may be provided as an additional component.

In the context of the present description, the term "light" is understood to refer to electromagnetic radiation in any appropriate region of electromagnetic spectrum and is not limited to visible light. For example, in embodiments of the invention for use in the telecommunications industry, the term "light" is meant to encompass electromagnetic radiation with a wavelength included in a range of between about 1520 nm to 1630 nm encompassing the C-band and L-band transmission windows for telecommunication applications, and of between about 1000 nm and 2000 nm for sensing applications.

The optical fiber 34 extends along the planar waveguide 22 with the angled tip 40 positioned such that light propagating in the light-guiding fiber core 36 along a fiber propagation direction is reflected by the reflection interface 44 toward the waveguide coupling element 32.

In the embodiment illustrated in FIG. 1, the optical fiber 34 is positioned over the planar waveguide 22 so that the fiber cladding 38 is in direct contact with and extends contiguously from the planar waveguide 22. Alternatively, in other embodiments such as the one illustrated in FIG. 3, the fiber cladding 38 and the planar waveguide 22 may be slightly spaced away from each other and may include therebetween a separation layer 45. The separation layer 45 may include, without being limited to, an optically-transparent adhesive, a layer of an index-matching material, or air. It will be understood by one of ordinary skill in the art that the distance between the optical fiber 34 and the planar waveguide 22 should be minimized in order to maintain high optical power coupling efficiency therebetween.

In the embodiment of FIG. 1, the optical fiber 34 is disposed over the planar waveguide 22 so as to ensure that the light-guiding fiber core 36 is parallel to the core layer 28 of the planar waveguide 22. In alternate embodiments, the light-guiding fiber core 36 and the core layer 28 may define a non-zero angle therebetween, as will be further described hereinbelow.

The angle of incidence $\theta_2$ at which the light traveling along the light-guiding fiber core 36 is reflected by the reflection interface 44 toward the planar waveguide 22 depends on the cut angle $\theta_1$ and may be determined by the Snell's law which describes the behavior of light when moving between media of differing refractive indices, and by simple geometry. In the embodiment of FIG. 1, the light-guiding fiber core 36 is parallel to the core layer 28 so that the angle of incidence $\theta_2$ made by the light reflected by the reflection interface 44 with respect to a normal N to a plane of the planar waveguide 22 is given by the following relation:

$$\theta_2 = 2 \times (45° - \theta_1)$$

Upon inspection of Equation (1), one of ordinary skill in the art will understand that, in practice, the angle of incidence $\theta_2$ should be different from zero in order to avoid back-reflections due to Fresnel reflection and second-order Bragg diffraction at the top surface 46 of the planar waveguide 22.

Still referring to FIG. 1, the angled tip 40 of the optical fiber 34 extending along the planar waveguide 22 is positioned such that light reflected by the reflection interface 44 toward the waveguide coupling element 32 is coupled by the waveguide coupling element 32 to propagate in the light-guiding path 24 of the planar waveguide 22 along a waveguide propagation direction opposite to the fiber propagation direction. It will be understood that this condition implies that the angle of incidence $\theta_2$, as defined above in Equation (1), should be negative. In the embodiment illustrated in FIG. 1, this also implies that the cut angle $\theta_1$ of the angled tip 40 should therefore be greater than 45°.

One of ordinary skill in the art will also understand that, in addition to the simple geometrical considerations outlined above and mathematically expressed in Equation (1), other factors may impact the value of the angle of incidence $\theta_2$ for a given value of the cut angle $\theta_1$. In particular, Equation (1) assumes that light reflected by the reflection interface 44 travels in straight line from the reflection interface 44 to the waveguide coupling element 32, which, in the embodiment of FIG. 1, will hold only if the fiber cladding 38 of the optical fiber 34 and the upper cladding layer 30 of the planar waveguide 22 have a same refractive index. As known by those skilled in the art, differences in refractive index along the path of light will deflect the propagation direction thereof, in accordance with Snell's law, and should therefore be taken into account in ensuring that $\theta_2$ remains negative. Furthermore, additional layers of material (e.g. an optically-transparent adhesive or a layer of an index-matching material) or air between the reflection interface 44 and the waveguide coupling element 32 may also impact the angle incidence the light on the waveguide coupling element 32. In this regard, it will be understood by one of ordinary skill in the art that in order for light to be coupled in the light-guiding path 24 of the planar waveguide 22 in a waveguide propagation direction opposite to the fiber propagation direction, the angle of incidence $\theta_2$ should be negative as measured in the vicinity of the waveguide coupling element 32.

It also will be recognized by one of ordinary skill in the art that counter propagation of light in the planar waveguide 22 allows, for a given absolute value of $\theta_2$, to cut the optical fiber 34 at a greater cut angle $\theta_1$ when $\theta_2$ is negative, as in the embodiment shown in FIG. 1, than when $\theta_2$ is positive. Advantageously, this greater value for the cut angle $\theta_1$ facilitates manufacturing since a steeper angled tip 40 is less prone to chipping.

According to another aspect of the invention, there is provided an optical coupling assembly including a planar waveguide and an optical fiber component having, among other features, a tapered peripheral portion. Referring now to FIGS. 2 to 5, there are shown schematic cross-sectional side views of exemplary optical coupling assemblies 20 according to embodiments of the invention.

As will be understood from the following description, the optical coupling assemblies 20 illustrated in FIGS. 2 to 5 share several common features with the optical coupling assembly 20 described above with reference to FIG. 1. Therefore, the description of any common feature or variant thereof that were described above in relation to the embodiment shown in FIG. 1 will not be discussed in further detail hereinbelow.

Figure 2:
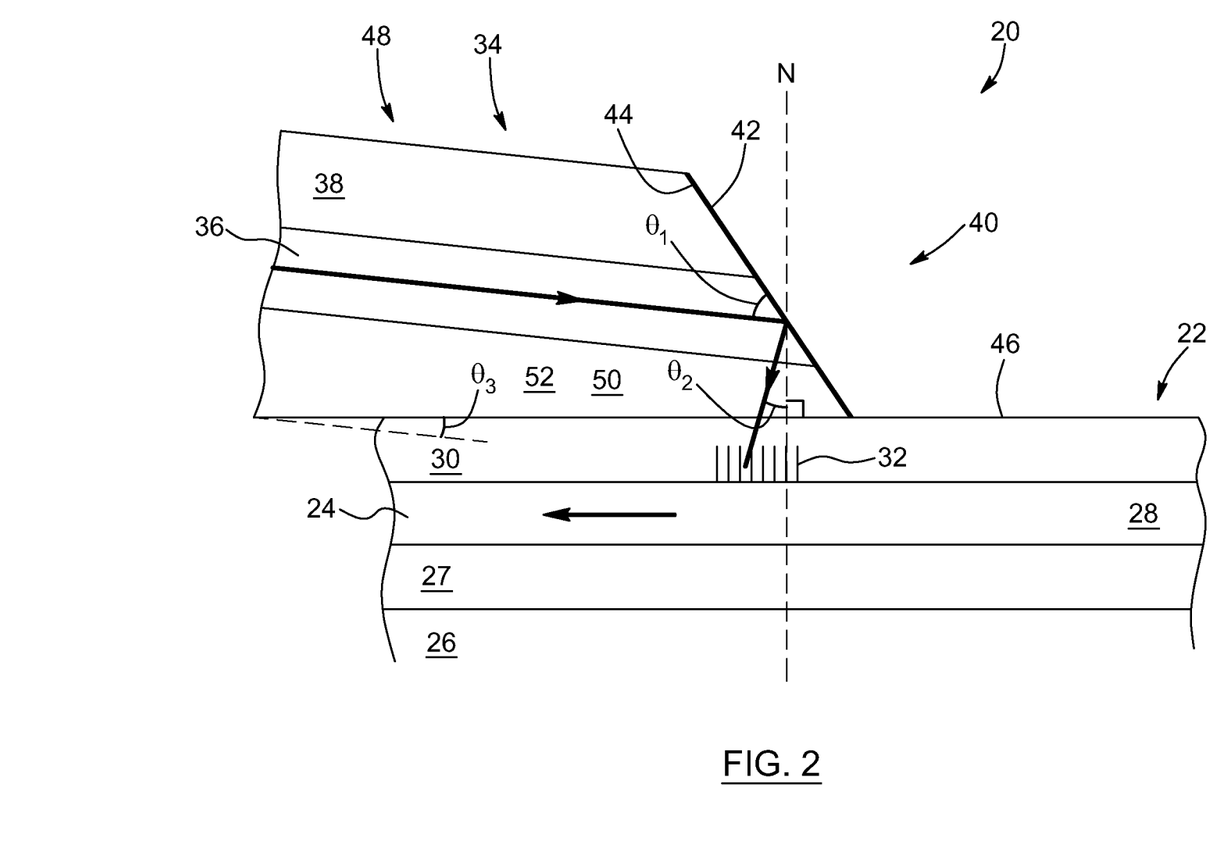
FIG. 2 is a schematic cross-sectional side view of an optical coupling assembly according to another embodiment of the present invention, wherein the propagation direction of light in the light-guiding path of the planar waveguide is opposite to the propagation direction of light in the light-guiding fiber core, and wherein the optical fiber component includes a tapered fiber cladding portion.

Referring now specifically to FIG. 2, the optical coupling assembly 20 first includes a planar waveguide 22 having a light-guiding path 24. As mentioned above, the planar waveguide 22 may be embodied, for example, by a slab waveguide, a strip waveguide, a ridge waveguide and a rib waveguide. In the illustrated embodiment, the planar waveguide 22 is a SOI waveguide and includes, successively, a substrate layer 26, a lower cladding layer 27 and a core layer 28 defining the light-guiding path 24. In this embodiment, an optional upper cladding layer 30 may also be provided. Again, it will be understood that other SOI waveguides 22 may be provided without an upper cladding layer 30 disposed over the core layer 28.

The optical coupling assembly 20 also includes an optical fiber component 48, having a light-guiding fiber core 36 surrounded by a fiber cladding 38. In the embodiment illustrated in FIG. 2, as well as that of FIGS. 3 and 4, the optical fiber component 48 is simply an optical fiber 34, as in the embodiment of FIG. 1. However, in other embodiments, the optical fiber component 48 may include additional structural elements, as will be discussed in further detail below with reference to the embodiment of FIG. 5.

Referring back to FIG. 2, the optical fiber component 48 also includes an angled tip 40 making a cut angle $\theta_1$ with respect to the light-guiding fiber core 36 and defining a reflection interface 44. In some embodiments, a reflective layer 42 may be provided on the angled tip 40 of the optical fiber 34. However, in this embodiment, the reflective layer 42 is optional and may be omitted if $\theta_1$ exceeds the critical angle predicted by Snell's law for total internal reflection at the reflection interface 44 the angled tip 40 and the surrounding medium. Hence, in these embodiments, light propagating in the light-guiding fiber core 36 and impinging upon the reflection interface 44 may be reflected thereby by total internal reflection.

The optical coupling assembly 20 further includes a waveguide coupling element 32 (e.g. a diffraction grating) for coupling light between the optical fiber 34 and the planar waveguide 22. Again, it will be understood that, while the waveguide coupling element 28 is disposed in a region of the upper cladding proximate to the core layer 28 in the embodiment of FIG. 2, embodiments of the optical coupling assembly 20 are not limited by the location of the waveguide coupling element 32 within the planar waveguide 22 and various configurations are encompassed within the scope of the present invention.

As opposed to the optical fiber 34 of the embodiment of FIG. 1, the optical fiber component 48 of the embodiment of FIG. 2 also includes a tapered peripheral portion 50 tapering toward the angled tip 40 at a tapering angle $\theta_3$. From geometrical considerations, the angle of incidence $\theta_2$ on the waveguide coupling element 32 of the light reflected by the reflection interface 44 may be expressed as:

$$\theta_2 = 2 \times (45° - \theta_1) - \theta_3$$

It will be understood that, in this configuration, counter propagation of light in the planar waveguide 22, corresponding to the condition $\theta_2 < 0$, may be realized when the cut angle $\theta_1$ satisfies the inequality $\theta_1 > 45° - \theta_3/2$. Likewise, forward propagation of light in the planar waveguide 22, corresponding to the condition $\theta_2 > 0$, may be realized when the cut angle $\theta_1$ satisfies the inequality $\theta_1 < 45° - \theta_3/2$.

As will also be understood by one of ordinary skill in the art, in a given embodiment of the optical coupling assembly 20, the tapering angle $\theta_3$ may be designed according to the geometry or configuration of the waveguide coupling element 32 provided with a particular planar waveguide 22. Furthermore, depending on the intended application, the tapering angle $\theta_3$ may also be designed in order to minimize or maximize the contact surface between the optical fiber component 48 and the planar waveguide 22.

In some embodiments, the cut angle $\theta_1$ of the angled tip 40 and the tapering angle $\theta_3$ of the tapered peripheral portion 50 may be jointly selected so that the light impinging on the reflection interface 44 and reflected thereby toward the waveguide coupling element 32 is incident on the waveguide coupling element 32 at an incidence angle $\theta_2$ of between about 5 and 20 degrees or between about −5 and −20 degrees with respect to the normal N to a plane of the planar waveguide 22, that is, on either side of the normal N. For example, in the embodiment shown in FIG. 2, a cut angle $\theta_1$ of 50° combined with a tapering angle $\theta_3$ of 6° together yield an incidence angle $\theta_2$ of −16°.

The waveguide coupling element 32 provided with the optical coupling assembly 20 illustrated in FIGS. 2 to 5 may couple light in the light-guiding path 24 of the planar waveguide 22 along a waveguide propagation direction that is either substantially the same (i.e. when $\theta_2 > 0$) or opposite (i.e. when $\theta_2 < 0$) to a fiber propagation direction. For example, referring now to FIG. 4, there is shown another optical coupling assembly 20 according to an embodiment of the invention, wherein light is coupled in the light-guiding 24 path of the planar waveguide 22 along a waveguide propagation direction substantially the same as the fiber propagation direction of light traveling along the light-guiding fiber core 36 of the optical fiber component 48. More particularly, in this embodiment, the cut angle $\theta_1$ of 38° combined with the tapering angle $\theta_3$ of 6° together yield a positive incidence angle $\theta_2$ of 8°.

The fiber cladding 38 of the optical fiber 34 preferably includes a tapered fiber cladding portion 52 defining at least part of the tapered peripheral portion 50 of the optical fiber component 48. For example, in the embodiments of FIGS. 2 to 4, the tapered fiber cladding portion 52 defines completely the tapered peripheral portion 50. Alternatively, the light-guiding fiber core 36 may include also a tapered fiber core portion defining part of the tapered peripheral portion 50. In other words, in this embodiment, the tapered peripheral portion 50 of the optical fiber component 48 is obtained by removing both a part of the fiber cladding 38 and a part of the light-guiding fiber core 36.

Referring back to FIG. 2, the optical fiber component 48 is disposed over the planar waveguide 22 with the tapered peripheral portion 50 extending therealong such that light propagating in the light-guiding fiber core 36 of the optical fiber component 48 along a fiber propagation direction is reflected by the reflection interface 44 toward the waveguide coupling element 32 and coupled thereby to propagate along a waveguide propagation direction in the light-guiding path 24 of the planar waveguide 22.

Figure 3:
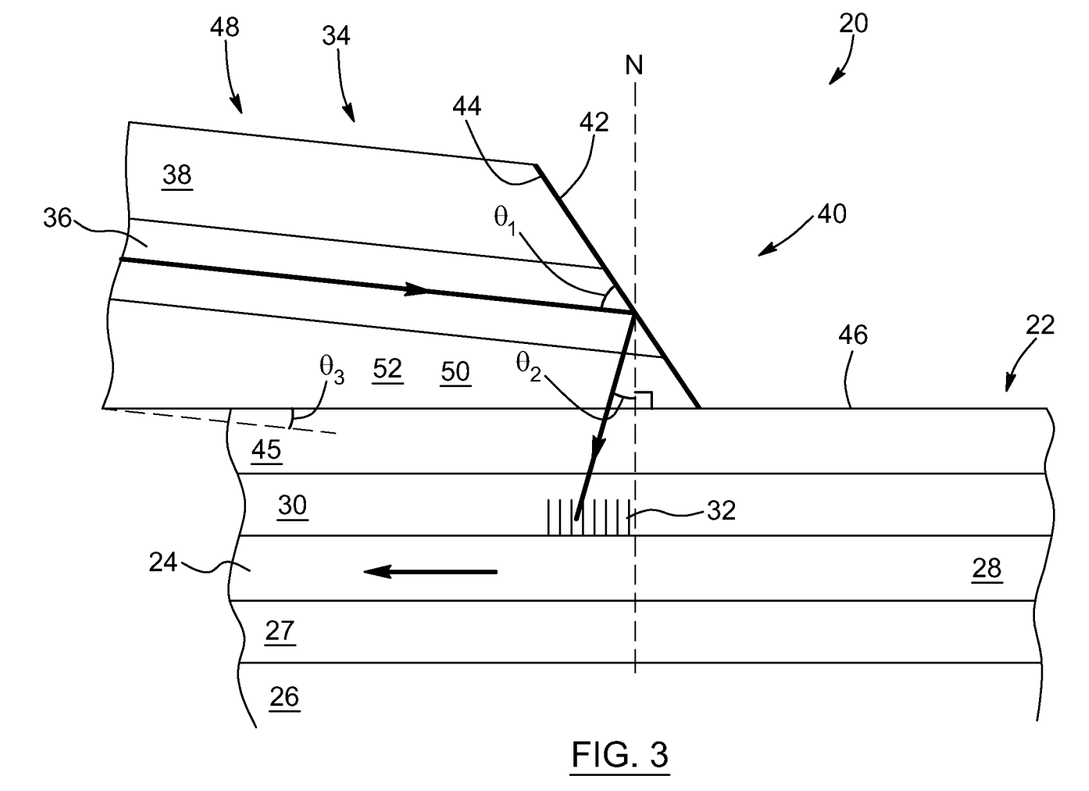
FIG. 3 is a schematic cross-sectional side view of an optical coupling assembly according to another embodiment of the present invention, wherein the propagation direction of light in the light-guiding path of the planar waveguide is opposite to the propagation direction of light in the light-guiding fiber core, and wherein the optical fiber component includes a tapered fiber cladding portion. The optical coupling assembly further includes a separation layer between the optical fiber component and the planar waveguide
Figure 4:
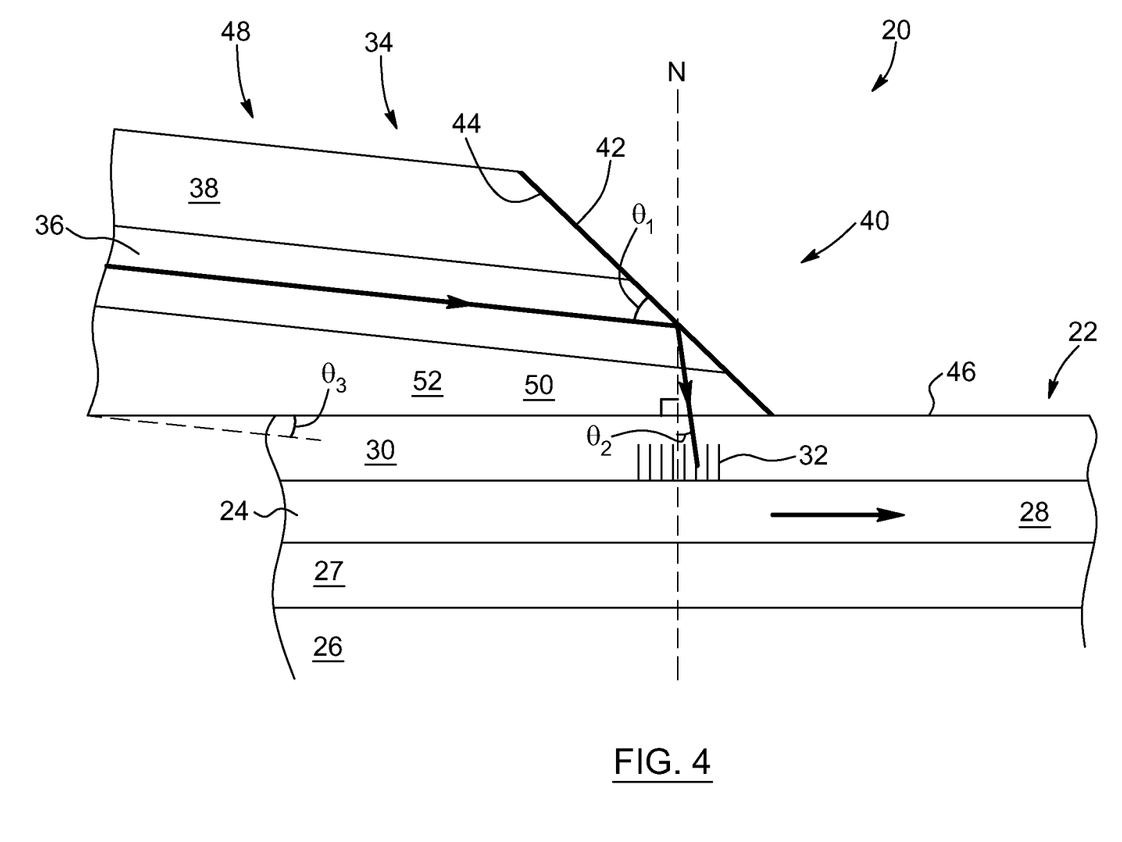
FIG. 4 is a schematic cross-sectional side view of an optical coupling assembly according to another embodiment of the present invention, wherein the propagation direction of light in the light-guiding path of the planar waveguide is generally the same as the propagation direction of light in the light-guiding fiber core, and wherein the optical fiber component includes a tapered fiber cladding portion.

In the embodiment illustrated in FIG. 2, the tapered fiber cladding portion 52, which defines completely the tapered peripheral portion 50 of the optical fiber component 48, is in direct contact with and extends contiguously from the cladding layer 30 of the planar waveguide 22. Alternatively, as shown in FIG. 3, the tapered fiber cladding portion 52 and the cladding layer 30 of the planar waveguide 22 may be slightly spaced away from each other and may include therebetween a separation layer 45, for example an optically-transparent adhesive, a layer of an index-matching material, or air.

The optical coupling assemblies 20 of the embodiments illustrated in FIGS. 2 to 5 may be manufactured in a similar fashion than the optical coupling assemblies 20 of FIG. 1, with an added step of removing a peripheral portion of the optical fiber component 48 by polishing, cleaving, grinding, sawing, etching, FIB machining laser machining or another appropriate means in order to define the tapered peripheral portion 50 of the optical fiber component 48 prior to disposing the same over the planar waveguide 22.

Figure 6A:
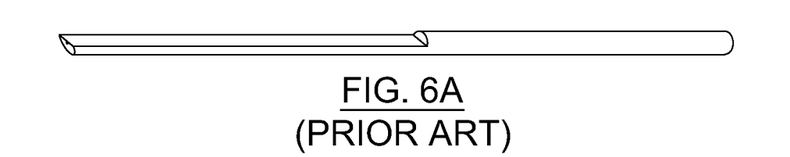
FIG. 6A (PRIOR ART) is a perspective side view of an optical fiber having a straight cut along a longitudinal portion thereof for coupling to a planar waveguide according to the prior art.
Figure 6B:
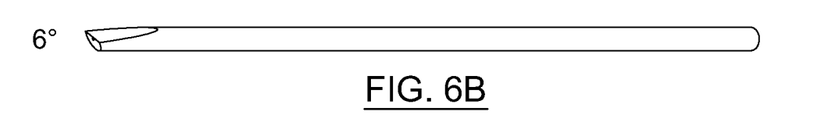
FIGS. 6B to 6D are perspective side views of optical fibers having an angled tip cut at a cut angle of 6°, 4° and 2°, respectively, for coupling to a planar waveguide according to embodiments of the present invention.
Figure 6C:
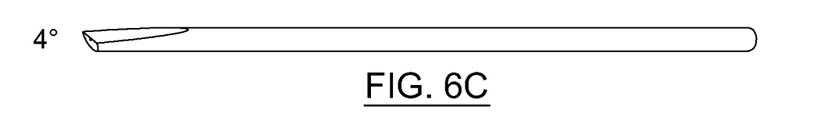
Figure 6D:
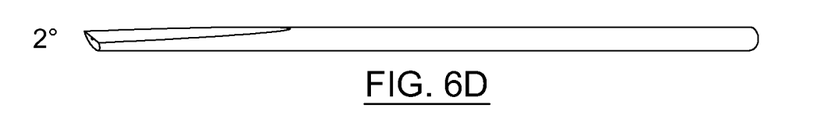

Referring now to FIGS. 6B to 6D, there are shown optical fibers provided with a tapered peripheral portion at a tapering angle of 6°, 4° and 2°. These tapered optical fibers illustrate advantages of the approach according to embodiments of the present invention over the prior art technique of defining a straight cut along the cladding of the fiber, which is exemplified in FIG. 6A (PRIOR ART). The straight cut of FIG. 6A (PRIOR ART) is difficult to produce and generally requires a complex apparatus since the removal of the fiber cladding must be very precise on a relatively long portion of the optical fiber along the axis thereof. This long portion is required to ensure a good contact between the optical fiber and the planar waveguide.

Figure 5:
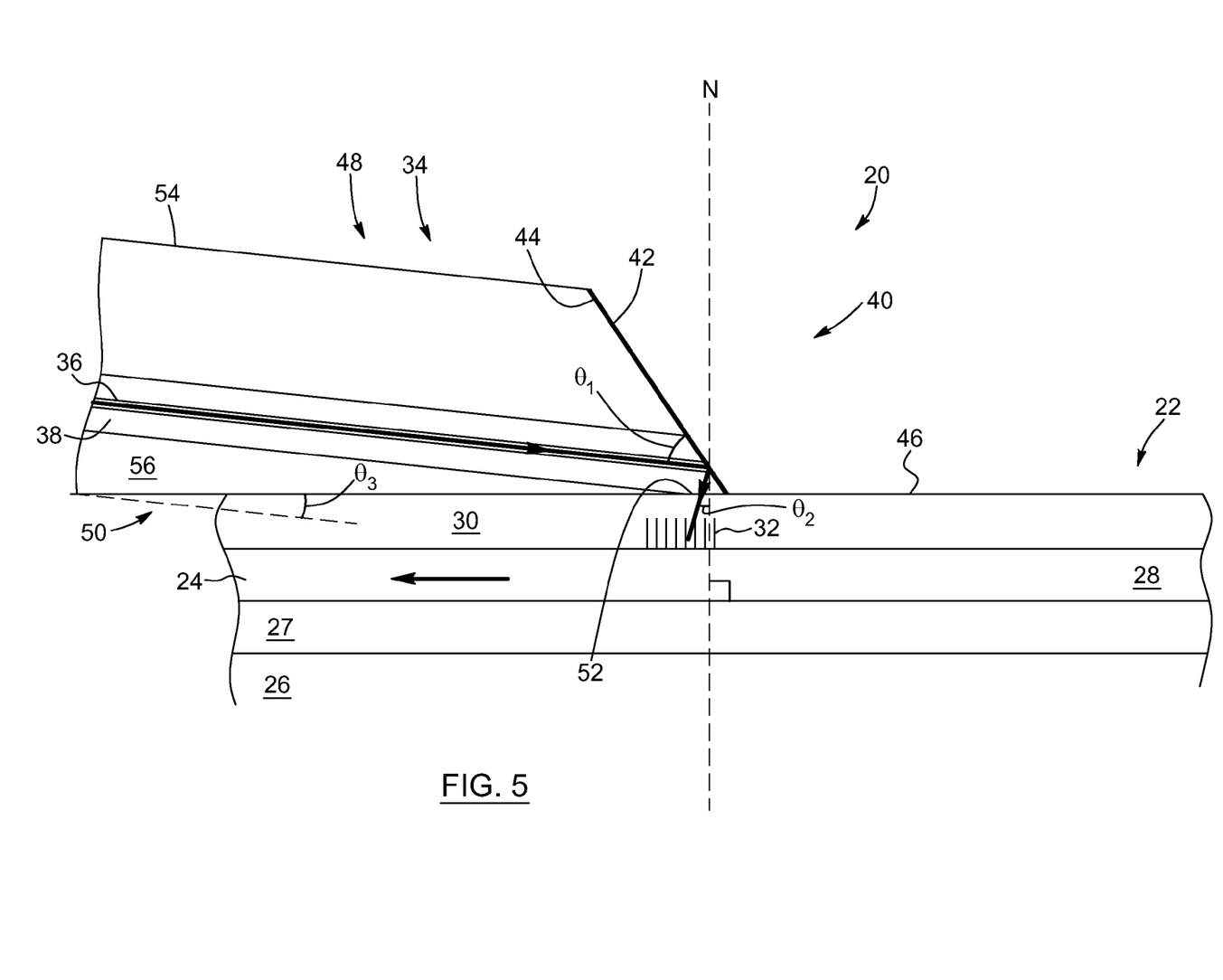
FIG. 5 is a schematic cross-sectional side view of a an optical coupling assembly according to another embodiment of the present invention, wherein the propagation direction of light in the light-guiding path of the planar waveguide is opposite to the propagation direction of light in the light-guiding fiber core, and wherein the optical fiber component includes a fiber support including a tapered support portion.

By contrast, providing an optical fiber with a tapered peripheral portion tapering at a tapering angle toward one extremity thereof may be performed with standard off-the-shelf polishing, grinding or dicing equipment and methods, so that no additional modification or complex equipment is required. Moreover, contrary to the case of FIG. 6A (PRIOR ART), the approach according to embodiments of the present invention involves no abrupt discontinuity in the thickness of the fiber cladding along the length of the optical fiber. The procedure is further simplified as only a limited portion of the fiber cladding needs to be polished or otherwise removed in FIGS. 6B to 6D, whereas in FIG. 6A (PRIOR ART), a portion of the fiber cladding must be removed along the whole length of the optical fiber to be disposed over the planar waveguide It will be understood by one of ordinary skill in the art that the tapered peripheral portion according to embodiments of the invention need not be fashioned directly into the fiber cladding of the optical fiber, as is the case for the embodiments of FIGS. 2 to 4. Referring now to FIG. 5, there is shown yet another embodiment of an optical coupling assembly 20. This embodiment differs from the embodiments of FIGS. 2 to 4 in that the optical fiber component 48 further includes a fiber support 54 extending along the fiber cladding 38 proximate the angled tip 40 thereof. The fiber support 54 includes a tapered support portion 56 defining at least part of the tapered peripheral portion 50. In the illustrated embodiment, the fiber support 54 is an optical ferrule surrounding the fiber cladding, but other components may be used for supporting the optical fiber 34, including a v-groove support or other appropriate holder. The optical ferrule 54 illustrated in FIG. 5 may be made of any appropriate material such as Kovar™, Invar™, zirconia, borosilicate, silica or the like, and the optical fiber 34 may be assembled in the optical ferrule 54 by various attachment means such as soldering, glass solder, adhesive or mechanical crimping.

It will be understood that in other embodiments, the fiber support may be adapted to hold a plurality of optical fibers to be coupled on a given planar waveguide without departing from the scope of the present invention. In such embodiments, the fiber support may be, for example, a multiple-hole optical ferrule, a v-groove array or a rectangular block having multiple holes bored therethrough.

The optical coupling assembly 20 as exemplified in FIG. 5 may be manufactured by providing the fiber support 54 (e.g. optical ferrule) around one extremity of the optical fiber 34 and by performing two successive cuts to define the angled tip 40 and the tapered peripheral portion 50 of the optical fiber component 48. It will be understood that if the fiber support 54 is not made of a transparent material, it should preferably be cut so as to be completely absent from the optical path of the light reflected by the waveguide coupling element 32. In such a case, a portion of the tapered peripheral portion 50 would then be cut along the fiber cladding 38 of the optical fiber 34 at one extremity thereof, thereby defining a tapered fiber cladding portion 52. It will also be understood that using a fiber support such as an optical ferrule or a v-groove support for holding the optical fiber firmly while removing material from the extremity thereof would further ease the manufacturing process, and reduce the risk of chipping the extremity of the optical fiber while performing the two cuts.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An optical coupling assembly, comprising:
   a planar waveguide comprising a light-guiding path;
   an optical fiber comprising a light-guiding fiber core surrounded by a fiber cladding and having an angled tip;
   a reflective layer, provided on the angled tip, defining a reflection interface; and
   a waveguide coupling element for coupling light between the optical fiber and the planar waveguide,
   the optical fiber extending along the planar waveguide with the angled tip positioned such that light propagating in the light-guiding fiber core along a fiber propagation direction is reflected by the reflection interface toward the waveguide coupling element and coupled thereby to propagate in the light-guiding path of the waveguide along a waveguide propagation direction opposite to the fiber propagation direction.

2. The optical coupling assembly according to claim 1, wherein the planar waveguide is one of a slab waveguide, a strip waveguide, a ridge waveguide and a rib waveguide.

3. The optical coupling assembly according to claim 1, wherein the waveguide coupling element is a diffraction grating.

4. The optical coupling assembly according to claim 3, wherein the diffraction grating comprises linear corrugations within the planar waveguide.

5. The optical coupling assembly according to claim 3, wherein the diffraction grating comprises a photonic crystal structure embedded within the planar waveguide.

6. The optical coupling assembly according to claim 1, wherein the planar waveguide is a silicon-on-insulator waveguide comprising, successively, a substrate layer, a lower cladding layer, and a core layer comprising the light-guiding path.

7. The optical coupling assembly according to claim 6, further comprising an upper cladding layer disposed over the core layer.

8. The optical coupling assembly according to claim 1, wherein the fiber cladding is in direct contact with the planar waveguide.

9. The optical coupling assembly according to claim 1, further comprising a separation layer between the fiber cladding and the planar waveguide.

10. The optical coupling assembly according to claim 9, wherein the separation layer comprises one of an optically-transparent adhesive, a layer of an index-matching material and air.

11. The optical coupling assembly according to claim 1, wherein the angled tip makes a cut angle greater than 45 degrees with respect to the light-guiding fiber core.

12. The optical coupling assembly according to claim 1, wherein the reflective layer comprises at least one of a metallic coating and a dielectric coating.

13. The optical coupling assembly according to claim 12, wherein the metallic coating comprises one of a gold coating, a silver coating and an aluminum coating.

14. An optical coupling assembly, comprising:
    a planar waveguide comprising a light-guiding path;
    an optical fiber component comprising a light-guiding fiber core surrounded by a fiber cladding, an angled tip making a cut angle with respect to the light-guiding fiber core and defining a reflection interface, and a tapered peripheral portion tapering toward the angled tip at a tapering angle; and
    a waveguide coupling element for coupling light between the optical fiber component and the planar waveguide,
    the optical fiber component being disposed over the planar waveguide with the tapered peripheral portion extending therealong such that light propagating in the light-guiding fiber core of the optical fiber component is reflected by the reflection interface toward the waveguide coupling element and coupled thereby to propagate in the light-guiding path of the planar waveguide.

15. The optical coupling assembly according to claim 14, wherein the planar waveguide is one of a slab waveguide, a strip waveguide, a ridge waveguide and a rib waveguide.

16. The optical coupling assembly according to claim 14, wherein the waveguide coupling element is a diffraction grating.

17. The optical coupling assembly according to claim 16, wherein the diffraction grating comprises linear corrugations within the planar waveguide.

18. The optical coupling assembly according to claim 16, wherein the diffraction grating comprises a photonic crystal structure embedded within the planar waveguide.

19. The optical coupling assembly according to claim 14, wherein the planar waveguide is a silicon-on-insulator waveguide comprising, successively, a substrate layer, a lower cladding layer and a core layer comprising the light-guiding path.

20. The optical coupling assembly according to claim 19, further comprising an upper cladding layer disposed over the core layer.

21. The optical coupling assembly according to claim 14, wherein the cut angle and the tapering angle are jointly selected so that light reflected by the reflection interface toward the waveguide coupling element is incident thereon at an incidence angle of between about 5 and 20 degrees on either side of a normal to a plane of the planar waveguide.

22. The optical coupling assembly according to claim 14, wherein light propagating in the light-guiding fiber core is reflected by the reflection interface by total internal reflection.

23. The optical coupling assembly according to claim 14, further comprising a reflective layer provided on the angled tip.

24. The optical coupling assembly according to claim 14, wherein the fiber cladding comprises a tapered fiber cladding portion defining at least part of the tapered peripheral portion.

25. The optical coupling assembly according to claim 14, wherein the optical fiber component further comprises a fiber support extending along the fiber cladding proximate the angled tip thereof, the fiber support comprising a tapered support portion defining at least part of the tapered peripheral portion.

26. The optical coupling assembly according to claim 25, wherein the fiber support comprises one of an optical ferrule and a v-groove support.

27. The optical coupling assembly according to claim 14, wherein the tapered peripheral portion is in direct contact with the planar waveguide.

28. The optical coupling assembly according to claim 14, further comprising a separation layer between the tapered peripheral portion and the planar waveguide.

29. The optical coupling assembly according to claim 28, wherein the separation layer comprises one of an optically-transparent adhesive, a layer of an index-matching material and air.

* * * * *